(12) United States Patent
Zaghib et al.

(10) Patent No.: US 8,482,839 B2
(45) Date of Patent: Jul. 9, 2013

(54) ELECTROCHROMIC OPTICAL LENS

(75) Inventors: Karim Zaghib, Longueuil (CA); Mathieu Feuillade, Saint Maur (FR); Jean-Francois Labrecque, Montreal (CA); Abdelbast Guerfi, Brossard (CA)

(73) Assignees: Hydro-Quebec, Montreal, Quebec (CA); Essilor International (Compagne General d'Optique), Charenton-le-Pont (FR)

( * ) Notice: Subject to any disclaimer, the term of this patent is extended or adjusted under 35 U.S.C. 154(b) by 118 days.

(21) Appl. No.: 12/747,708

(22) PCT Filed: Dec. 8, 2008

(86) PCT No.: PCT/FR2008/001704
§ 371 (c)(1),
(2), (4) Date: Dec. 29, 2010

(87) PCT Pub. No.: WO2009/098415
PCT Pub. Date: Aug. 13, 2009

(65) Prior Publication Data
US 2011/0122476 A1    May 26, 2011

(30) Foreign Application Priority Data
Dec. 12, 2007 (FR) ..................... 07 08659

(51) Int. Cl.
*G02F 1/153* (2006.01)
*G02F 1/15* (2006.01)

(52) U.S. Cl.
USPC ............................ 359/270; 359/265; 359/273

(58) Field of Classification Search
USPC ......................................... 359/265, 270, 273
See application file for complete search history.

(56) References Cited

U.S. PATENT DOCUMENTS

| 5,657,150 A | 8/1997 | Kallman |
| 2002/0110739 A1 | 8/2002 | McEwen |
| 2004/0097757 A1 | 5/2004 | Cernik |
| 2006/0188788 A1 | 8/2006 | Michot |

FOREIGN PATENT DOCUMENTS

| EP | 0 850 920 A | 7/1998 |
| JP | 2003 043526 A | 2/2003 |
| WO | WO 97/26661 | 7/1997 |

OTHER PUBLICATIONS

International Search Report from PCT/FR2008/001704 dated Jul. 2, 2009, 4 pages.

*Primary Examiner* — William Choi
(74) *Attorney, Agent, or Firm* — WRB-IP LLP; David J Serbin

(57) ABSTRACT

The invention relates to an electrochromic optical lens and a method for the preparation thereof. The lens includes an electrode and a counter-electrode bearing an electrochromic material separated by a solid polymer electrolyte. The method consists of preparing the electrode and the counter-electrode and the assembly thereof by the surfaces thereof bearing the electrochromic material by interleaving an electrolyte membrane between said surfaces. The electrolyte membrane is interleaved in the form of a composition free of volatile liquid solvent, including a precursor of the polymer and a salt, which is liquid or which has a dynamic viscosity [mu] between 100 and 106 Pa·s.

30 Claims, No Drawings

ELECTROCHROMIC OPTICAL LENS

The present invention relates to a process for producing electrochromic optical lenses, and also to the lenses obtained.

BACKGROUND OF THE INVENTION

Electrochromic devices produced by depositing a composition containing a crosslinkable polymer onto a suitable support (for example one of the electrodes), followed by in situ crosslinking, are known. EP-0 850 920 describes the production of an electrochromic device via a process that consists in applying a polymerizable composition onto a glass plate coated with a layer of $WO_3$ and a tin oxide conductive sublayer, in photopolymerizing by UV irradiation to obtain a membrane that is optically transparent in the visible range and adherent to the support, and then in assembling this membrane with a counterelectrode formed from a glass plate bearing a layer of hydrogenated iridium oxide $H_xIrO_2$ and a tin oxide sublayer. In this process, the polymerizable composition is formed from the lithium salt of trifluoromethanesulfonyl(1-acryloyl-2,2,2-tri-fluoroethanesulfonyl)imide, poly(ethylene glycol)dimethacrylate, silica particles and xanthone. However, xanthone has coloring properties, and its presence in the electrolyte reduces the transparency. In addition, silica dissolves very poorly in a polymer without solvent, it increases the porosity of the material and it also contributes toward reducing the transparency.

WO 97/26661 describes an electrochromic device comprising an assembly that is formed by two electrochromic layers separated by a film of ion-conducting material and which is placed between two convex lenses. Each electrochromic layer is borne by a substrate coated with a conductive oxide of the ITO type. The ion-conducting material forms an ion-conducting polymer electrolyte and it is formed by a proton-conducting polymer, for example a 2-acrylamido-2-methylpropanesulfonic acid homopolymer. The polymer film is produced by depositing onto one of the electrodes a liquid reaction mixture containing the polymer precursor dissolved in a liquid solvent, for example a mixture of water and NMP. The presence of the liquid solvent in the composition intended to form the solid electrolyte necessitates removal of the liquid solvent, the result of which is that the film of polymer electrolyte resulting therefrom is porous. However, the porosity of a layer of an electrochromic device harms the optical quality of the electrochromic device.

SUMMARY OF THE INVENTION

The aim of the invention is to provide a process for producing an electrochromic device with a nonporous polymer electrolyte, which may be used as an electro-chromic lens for spectacles, which does not have the drawbacks of the prior art.

The process according to the present invention is intended for the production of an electrochromic lens comprising an electrode and a counterelectrode separated by a solid polymer electrolyte, the electrode being formed by a transparent substrate bearing an electronically conductive film coated with a film of a cathode active material with electrochromic properties, the counterelectrode being formed by a transparent substrate bearing an electronically conductive film coated with a film of an anode active material with electrochromic properties, the electrolyte being formed by an ion-conducting material comprising a salt dissolved in a solvating solid polymer.

The process according to the invention comprises the steps consisting in preparing said electrode and said counterelectrode, and in assembling them via their faces bearing the electrochromic material, by intercalating between said faces an electrolyte membrane, and it is characterized in that the electrolyte membrane is intercalated in the form of a composition of low viscosity free of volatile liquid solvent and comprising a polymer or a polymer precursor and a salt. The term "low viscosity" means either a liquid composition, or a composition whose dynamic viscosity $\mu$ is between 100 and $10^6$ Pa·s.

DETAILED DESCRIPTION OF PREFERRED EMBODIMENTS

When the composition intended to form the electrolyte comprises a polymer precursor and is intercalated in liquid form, it is applied to the electrochromic face of at least one of the transparent substrates, and the precursor is then subjected to polymerization or crosslinking. Applying the composition intended to form the electrolyte layer in liquid form has the result that said composition penetrates the porosity of the electrode and the counterelectrode, which creates a very good interface and provides an electrochemical bridge. The device thus has a lower impedance. In addition, the use of a solvent-free composition eliminates the need to remove said solvent and thus prevents the formation of porosity in the electrolyte film, given that porosity of the electrolyte film harms the performance of the device.

When the composition intended to form the electrolyte comprises a polymer and has a viscosity of between 100 and $10^6$ Pa·s, the process comprises an additional step that consists in applying to an auxiliary film a liquid composition containing a polymer precursor and a salt, in subjecting to crosslinking or polymerization, and then in depositing the film obtained by crosslinking or polymerization onto the face bearing the electrochromic material of one of the substrates, by applying a pressure with heat to bring the film obtained by polymerization or crosslinking to a viscosity of between 100 and $10^6$ Pa·s. Next, the auxiliary film is removed and the electrochromic face of the other substrate is applied to the face of the polymerized or crosslinked film freed by removal of the auxiliary film.

The auxiliary film is advantageously made of a polypropylene, a polyethylene, a polyethylene terephthalate or a polytetrafluoroethylene.

In a first embodiment, the liquid composition containing the polymer precursor is applied to the face bearing the electrochromic material of one of the transparent substrates, and then subjected to polymerization or crosslinking, after which the electrochromic face of the other substrate is applied to the polymer membrane obtained after crosslinking. In one particular embodiment of this first embodiment:

- an electronically conductive film and a film of a cathode active material with electrochromic properties are successively deposited onto one of the surfaces of a $1^{st}$ transparent substrate, to form the electrode,
- an electrically conductive film and a film of an anode active material with electrochromic properties are successively deposited on one of the surfaces of a $2^{nd}$ transparent substrate, to form the counterelectrode;
- a liquid composition intended to form the polymer electrolyte is applied to the film of electrochromic active material of one of the substrates and said composition is subjected to crosslinking or polymerization;
- the electrochromic face of the other substrate is applied to the membrane formed by crosslinking or polymerization of the composition.

In a second embodiment, the liquid composition containing the polymer precursor is injected into a space delimited by the free face of the film of electrochromic material of each of the preassembled substrates, and then subjected to polymerization or crosslinking. In one particular embodiment of this second embodiment:

an electrically conductive film and a film of a cathode active material with electrochromic properties are successively deposited on one of the surfaces of a $1^{st}$ transparent substrate, to form the electrode, an electrically conductive film and a film of an anode active material with electrochromic properties are successively deposited on one of the surfaces of a $2^{nd}$ transparent substrate, to form the counterelectrode;

a liquid composition intended to form the polymer electrolyte is applied to the film of electrochromic active material of one of the substrates;

the film of electrochromic material of the other substrate is applied to the layer of said composition;

said composition is subjected to crosslinking or polymerization.

The materials constituting the various layers of an electrochromic lens according to the invention are all materials that are transparent in the visible region of the light spectrum.

The ion-conducting material forming the electrolyte of the electrochromic lens is formed by a salt dissolved in a solvating solid polymer. It is obtained from a liquid composition that contains a liquid polymer precursor, a salt and optionally a diluent.

The solid polymer is a crosslinked polymer formed by solvating polymer chains connected via crosslinking nodes. The solvating polymer chains are especially of the polyether type or of the polyimine type. Chains of an ethylene oxide homopolymer (POE), a propylene oxide homopolymer (POP) and a copolymer of ethylene oxide or of propylene oxide with 2,3-epoxy-1-propanol are preferred in particular.

The liquid solvating polymer precursor used in the liquid composition intended to form the electrolyte may be chosen from liquid monomers and liquid polymers of low mass, which are precursors for the solvating polymer chains defined above.

The monomers are preferably chosen from ethylene oxide, propylene oxide and 2,3-epoxy-1-propanol.

The liquid polymers are preferably chosen from POE, POP and copolymers of ethylene oxide or of propylene oxide with 2,3-epoxy-1-propanol, the mass of which is low enough for them to be in the liquid state and in which certain repeating units bear reactive groups enabling subsequent crosslinking, for example acrylate groups. A mixture of a polymer of low molecular mass and a polymer of high molecular mass may also be used.

The electrolyte salt is preferably a salt of lithium and of an anion of delocalized electronic charge. Examples of anions that may be mentioned in particular include $Br^-$, $ClO_4^-$, $AsF_6^-$, $R_FSO_3^-$, $(R_FSO_2)_2N^-$ and $(R_FSO_2)_3C^-$, $R_F$ representing a perfluoroalkyl or perfluoroaryl group containing from 1 to 4 carbon atoms, and diaminocyclohexane-N,N'-tetraacetate ($DCTA^-$). The preferred ionic compounds are $(CF_3SO_2)_2N^-Li^+$ and $CF_3SO_3^-Li^+$, more particularly $(CF_3SO_2)_2N^-Li^+$. The salt concentration of the liquid composition intended to form the electrolyte is preferably from 0.1 M to 2 M.

The liquid composition intended to form the electrolyte may contain a diluent chosen from nonvolatile organic solvents of low viscosity and of high boiling point. Mention may be made in particular of a dipropylene glycol (DPG) dimethyl ether. Mention may also be made of low-viscosity acrylate monomers that are compatible with the polymers and salts used. The diluent is intended to remain in the electrolyte after crosslinking.

The application of the precursor composition of the electrolyte membrane is advantageously performed by spin coating. The application is preferably performed under a nitrogen atmosphere. In this mode of application, the liquid composition preferably contains a diluent.

The application of the precursor composition of the electrolyte membrane may also be performed using an applicator of scraper type, generally known as a doctor blade.

In one particular embodiment, a plastic film, for example a poly(ethylene terephthalate) film, may be interposed between the transparent substrate and the electronically conductive layer adjacent thereto.

The polymerization and crosslinking may be performed via a suitable technique, for example by irradiation with UV radiation or an electron beam, thermally or via UV irradiation combined with a heat treatment.

The crosslinking is performed in the presence of a suitable photoinitiator, for example Esacure KT046® sold by the company Lamberti, or the photoinitiators sold under the name Irgacure® by the company Ciba Specialty Chemicals. The content of photoinitiator in the liquid composition intended to form the electrolyte is preferably from 0.1% to 3%. The photoinitiator is not necessary when the crosslinking is performed using an electron beam.

In the first embodiment of the process, it is preferable to perform the photocrosslinking under an inert atmosphere, for example under a nitrogen atmosphere, to avoid inhibiting the radical polymerization with $O_2$. In the second embodiment, the presence of the transparent substrates prevents $O_2$ from diffusing in the liquid composition intended to form the electrolyte.

The UV radiation may be obtained with the aid of a UV lamp of the mercury lamp type, for example having a light energy of 1480 mJ over its entire emission spectrum.

The electrode and the counterelectrode each comprise a transparent substrate bearing a suitable electrochromic active material.

The transparent substrates are formed by any mineral, organic or composite material that is electronically conductive, and they are preferably chosen from the materials used for making ophthalmic lenses. The two transparent substrates are preferably formed from the same material.

Mineral glass with an index of 1.5 is the traditional material of ophthalmic optics. It is formed from 60-70% silicon oxide, the remainder being various components such as calcium, sodium and boron oxides. Mineral glass of index 1.6 is now tending to become the new standard in ophthalmic optics. Its higher index is obtained by adding to the mixture a significant proportion of titanium oxide.

"Sodocalcic" materials contain significant proportions of sodium and calcium and they constitute the traditional materials of optics; their refractive index is not particularly high ($n_d$=1.523) and their chromatic dispersion is low (constringence of about 60). "Borosilicate" materials have a high boron content and are materials that have been more recently used for the manufacture of medium-index glasses; they have a higher refractive index than that of sodocalcic materials ($n_d$=1.600).

Other mineral materials have a higher index. Mention may be made especially of titanium glasses (index 1.7 and constringence 41), lanthanum glasses (index 1.8 and constringence 34) and niobium glasses (refractive index 1.9 and constringence 30). A higher refractive index allows thinner glasses to be made.

In addition, the organic materials used in optics and in ophthalmie may be used as transparent substrate for an electrochromic lens of the invention. Nonlimiting examples that may be mentioned include polycarbonates; polyamides; polyimides; polysulfones; polymethyl methacrylates; copolymers of ethylene terephthalate and of carbonate; polyolefins, especially polynorbornenes; diethylene glycol bis(allyl carbonate) polymers and copolymers; (meth)acrylic polymers and copolymers, especially (meth)acrylic polymers and copolymers derived from bisphenol-A; thio(meth)acrylic polymers and copolymers; urethane and thiourethane polymers and copolymers; epoxy polymers and copolymers, and episulfide polymers and copolymers. These materials have a refractive index of between 1.50 and 1.80 with an Abe number (or constringence) of between 30 and 60. Advantageously, in the context of the invention, substrates formed from organic materials such as, for example, diethylene glycol bis(allyl carbonate) polymers and copolymers (more commonly known under the name CR39 and sold by the company PPG), (meth)acrylic copolymers, especially (meth)acrylic polymers and copolymers derived from bisphenol-A (such as Orma® and Ormus® sold by the company Essilor International), urethane and thiourethane polymers and copolymers, epoxy polymers and copolymers, episulfide polymers and copolymers, polycarbonates, polyamides and polymethyl methacrylates are preferably chosen.

The active material of the electrochromic electrode is a material that is capable of reversibly passing from a colored state to a colorless state under the effect of polarization, during oxidation. It may be chosen especially from $WO_3$, $Li_4Ti_5O_{12}$ and substituted polythiophenes [for example poly (3,4-ethylenedioxythiophene) known as PEDOT].

The active material of the electrochromic counterelectrode is a material that is capable of reversibly passing from a colored state to a colorless state under the effect of polarization, during reduction. It may be chosen especially from Prussian blue, $LiFePO_4$, $NiO_x$, conductive polymers of the polyaniline, polythiophene or polypyrrole type, and $H_xIrO_2$.

The material forming the conductive layers is a semiconductive material. It is advantageously chosen from tin oxide, indium oxide and zinc oxide derivatives. Mention may be made in particular of fluorine-doped tin oxide, tin-doped indium oxide (ITO), antimony-doped tin oxide and aluminum-doped zinc oxide. Indium titanium oxide (ITO) is particularly preferred.

The present invention is described in greater detail with the aid of the examples that follow, to which it is not, however, limited.

The products used are:
Baytron M®: 3,4-ethylenedioxythiophene (EDOT) sold by the company HC Starck;
Baytron C®: Fe III p-toluenesulfonate sold by the company HC Starck;
E6311-A: ethylene glycol dimethacrylate oxide polymer of molar mass Mw 2500 sold under the name EG-2500 by the company DKS (Japan);
E6311-B: ethylene oxide polymer of molar mass Mw 5000 sold under the name EG-5000 by the company DKS (Japan);
E6311-C: glyceryl tris[poly(oxyethylene(oxypropylene)] triacrylate of molar mass Mw 8000, sold under the name TA by the company DKS (Japan);
POE $10^6$: poly(ethylene oxide) of mass $10^6$ sold by the company Aldrich;
Esacure KTO46: photoinitiator sold by the company Sartomer Company, Inc., and formed by a mixture of phosphine oxide, α-hydroxy ketone and a benzophenone derivative;
DPG: dipropylene glycol dimethyl ether, solvent of high boiling point, sold by Clariant;
Torr Seal®: epoxy resin seal sold by the company Varian Inc.;
CR39: polycarbonate plate, sold by the company Essilor International.

Example 1

Preparation of an Electrode
ITO was deposited by cathodic sputtering onto a CR-39 plate. The layer of ITO obtained has a layer resistance of 50Ω/□. Next, a composition containing 8 g of Baytron M and 33 g of Baytron C was deposited by spin coating onto the CR39 plate coated with an ITO film, followed by a heat treatment at 60° C. for 1 hour to crosslink the thiophene monomer. The excess Baytron C was removed by washing with n-butanol. The electrode thus obtained has a PEDOT-substituted polythiophene electrochromic layer and it was electrochemically reduced to obtain the maximum coloration.

Example 2

Preparation of the Counterelectrode
ITO was deposited by cathodic sputtering onto a CR-39 plate with a layer resistance of 50Ω/□. Next, Prussian blue was deposited electrochemically onto the CR39 plate coated with an ITO film, to a thickness giving a capacitance of 3 mC/cm².

Example 3

Preparation of Precursor Compositions of the Electrolyte Membrane
Various precursor compositions (CME) of the electrolyte membrane containing one of the liquid polymers E6311, LiTFSI, KTO46 and DPG were prepared via the following process:
optional addition of DPG as diluent to E6311, and stirring for 5 minutes,
addition of LiTFSI to E6311, and stirring for 20 minutes,
addition of KTO46, and stirring of the mixture for 20 minutes before use.
The content of the constituents, expressed as weight %, is given in the following table for four compositions.

|  |  | E6311 | LiTFSI | KTO46 | DPG |
| --- | --- | --- | --- | --- | --- |
| CME1 | E6311-A | 65 | 0.6 | 2 | 32.4 |
| CME2 | E6311-B | 65 | 0.6 | 2 | 32.4 |
| CME3 | E6311-C | 96 | 1 | 3 | — |
| CME4 | E6311-B | 96 | 1 | 3 | — |

Example 4

Deposition of an Electrolyte Film onto a Substrate
Composition CME1 was deposited by spin coating onto a CR-39 plate, with a first step of 30 seconds at 600 rpm and a second step of 120 seconds at 1500 rpm. Next, the plate thus coated was introduced into a closed chamber purged beforehand for 10 seconds with a stream of nitrogen to remove the oxygen, followed by irradiation using a mercury lamp with the following energy: UVA 780 mJ, UVB 60 mJ, UVC 60 mJ, UVV 580 mJ. The membrane obtained after polymerization is transparent and non-tacky, and has a thickness of 6 μm. The degree of transmission is 92% in the visible range. The polymerized membrane consequently absorbs only a very small amount of visible light.

It is noted that the same result was obtained by using the composition CME1 after storage for one month.

Example 5

Assembly of an Electrochromic Cell, After Crosslinking of the Electrolyte

An electrochromic cell was assembled according to the following procedure.

The composition CME1 was deposited by spin coating onto a counterelectrode prepared according to the process of Example 2, with a first step of 30 seconds at 600 rpm and a second step of 120 seconds at 1500 rpm. Next, the counterelectrode thus coated was introduced into a closed chamber purged beforehand for 10 seconds with a stream of nitrogen to remove the oxygen, followed by irradiation using a mercury lamp with the following energy: UVA 780 mJ, UVB 60 mJ, UVC 60 mJ, UVV 580 mJ. The membrane obtained after polymerization is transparent and non-tacky, and has a thickness of 6 µm.

An electrode, obtained according to the process of Example 1, was deposited onto the surface of the polymer membrane obtained after UV irradiation, and the assembly thus formed was placed in a press system and compressed for 1 hour at 70° C., and then at room temperature for 12 hours.

The electrochromic cell thus formed was subjected alternately to a potential of −1 V and of +1 V. It was found that the color changed from pale blue to dark blue and reciprocally in less than 10 seconds.

However, it was found that the contact between the membrane forming the electrolyte and the adjacent layer of the electrode is not homogeneous.

Two other electrochromic cells were assembled according to the same process, but using, respectively, the composition CME2 and the composition CME4 instead of the composition CME1. In these cells, the thickness of the membrane forming the electrolyte is 6 µm for composition CME2 and 25 µm for composition CME4. In both cases, a color change was observed at the same speed as that observed for the device obtained using composition CME1. In the two cells, the same phenomenon of poor homogeneity between the layer of electrolyte and the layer d is observed.

Example 6

An electrochromic cell was produced according to the procedure of Example 1, with the following differences:
The composition intended to form the electrolyte, referred to herein as CME5, was prepared from 150 g of the polymer E6311-C, 32.62 g of LiTFSI and 0.15 g of KTO46, by mixing the constituents until the dissolution of the LiTFSI and the KTO46 in the polymer is complete.
The thickness of the layer of CME5 before crosslinking is 30 µm.
The crosslinking is performed by irradiation with a UV lamp (0.2 A, λ=365 nm) for 5 seconds.
After assembling the counterelectrode bearing the crosslinked polymer electrolyte membrane and the electrode, and pressurizing, the assembly is sealed using a Torr Seal® seal to form an electrochromic lens.
The lens thus obtained is dark blue at +1 V and light gray at −1 V. The color change takes place in 3 seconds.

Example 7

An electrochromic lens was produced according to the procedure of Example 5, with the difference that composition CME5 was applied to the electrode, and the counterelectrode was applied to the polymer membrane borne by the electrode.

The same colors and speeds of color change were observed.

Example 8

The procedure of Example 5 was repeated, but using a composition CME6 prepared from 197 g of polymer E6311-C, 49.3 g of polymer POE $10^6$, 53.56 g of LiTFSI and 0.24 g of KTO46.

It was found that the presence of a polymer of very high molecular weight substantially improved the adhesion between the electrolyte membrane and the electrochromic layers adjacent thereto.

The color changes as a function of polarization of the electrochromic lens obtained are similar to those observed for the lens of Example 7.

A similar result was obtained by applying composition CME6 to the electrode, and then the counterelectrode to the electrode bearing the electrolyte membrane.

Example 9

Crosslinking of the Electrolyte Polymer After Assembly of the Electrochromic Cell An electrochromic cell was assembled according to the following procedure.

Composition CME3 was deposited by spin coating onto a counterelectrode prepared according to the process of Example 2, with a first step of 30 seconds at 600 rpm and a second step of 120 seconds at 1500 rpm. Next, an electrode obtained according to the process of Example 1 was deposited on the surface of the layer of composition CME3, taking care to avoid short circuits between the electrode and the counterelectrode.

Irradiation of the layer CME3 with a UV lamp similar to that used in Example 4 was performed through the electrode, to photopolymerize said layer CME3. The thickness of the electrolyte membrane after polymerization is 20 µm.

Taking into account the absorption spectrum of the photoinitiator, the transmission window of the working electrode (CR39+ITO+PEDOT) and the emission spectrum of the mercury lamp used, the irradiation was able to be performed through the electrode.

The electrochromic cell thus formed was subjected alternately to a potential of −1 V and of +1 V. It was found that the color changed from pale blue to dark blue and reciprocally in less than 20 seconds.

The contact between the membrane forming the electrolyte and the adjacent layers is homogeneous.

Example 10

Comparison of an Electrolyte Prepared without Solvent and of an Electrolyte Prepared with Solvent
Electrolyte Prepared without Solvent An electrolyte composition was prepared as follows: 150 g of polymer based on polyethylene oxide (E6311C) with a molecular weight of 8000 was mixed with 32.6 g of salt LiTFSI, with stirring on a roll system for 12 hours. An amount of 1000 ppm of photoinitiator (KT46) relative to the weight of polymer was added, and the composition was then applied to a polypropylene (PP) support, by pressure at 10 psi with heat (t=80° C.), followed by crosslinking using a UV lamp at 365 nm for one minute. The 50-micron film obtained is free of porosity.

This film is used as an electrolyte film in a configuration: PET/ITO/PEDOT/electrolyte/Prussian blue/ITO/PET.

The coloration time of this window is less than 5 seconds.

Electrolyte Prepared with Solvent (Counterexample)

An electrolyte composition was prepared as follows: 49 g of the polymer POE $10^6$ were mixed with 122 ml of acetonitrile, 30 ml of acetone and 10 g of the salt LiTFSI, with stirring on a roll system for 12 hours. Next, an amount of 1000 ppm of photoinitiator (KT46) relative to the weight of the polymer was added, and the composition was then applied to a polypropylene (PP) support and the solvent was evaporated off at 40° C., followed by crosslinking using a UV lamp at 365 nm for one minute. The 30-micron film obtained is porous.

This film is used as an electrolyte film in a configuration: PET/ITO/PEDOT/electrolyte/Prussian blue/ITO/PET.

The coloration time of this window is greater than 10 seconds.

The invention claimed is:

1. A process for producing an electrochromic lens comprising an electrode and a counterelectrode separated by a solid polymer electrolyte, the electrode being formed by a transparent substrate bearing an electrically conductive film coated with a film of a cathode active material with electrochromic properties, the counterelectrode being formed by a transparent substrate bearing an electrically conductive film coated with a film of an anode active material with electrochromic properties, the electrolyte being formed by an ion-conducting material comprising a salt dissolved in a solvating solid polymer, said process comprising preparing said electrode and said counterelectrode, and assembling them via their faces bearing the electrochromic material by intercalating between said faces an electrolyte membrane, wherein the electrolyte membrane is intercalated in the form of a composition free of volatile liquid solvent and comprising a polymer precursor and a salt, said composition being liquid or having a dynamic viscosity $\mu$ of between 100 and $10^6$ Pa·s, and wherein the composition forming the electrolyte is a liquid composition, and said polymer precursor is subjected to polymerization or crosslinking after placed in contact with at least one of the electrode and the counterelectrode.

2. The process as claimed in claim 1, wherein the liquid composition containing the polymer precursor is applied to the face bearing the electrochromic material of one of the transparent substrates, and then subjected to polymerization or crosslinking, after which the electrochromic face of the other substrate is applied to the polymer membrane obtained after crosslinking.

3. The process as claimed in claim 2, wherein:
an electronically conductive film and a film of a cathode active material with electrochromic properties are successively deposited onto one of the surfaces of a $1^{st}$ transparent substrate, to form the electrode,
an electrically conductive film and a film of an anode active material with electrochromic properties are successively deposited on one of the surfaces of a $2^{nd}$ transparent substrate, to form the counterelectrode;
a liquid composition to form the polymer electrolyte is applied to the film of electrochromic active material of one of the substrates and said composition is subjected to crosslinking or polymerization; and
the electrochromic face of the other substrate is applied to the membrane formed by crosslinking or polymerization of the composition.

4. The process as claimed in claim 1, wherein the liquid composition containing the polymer precursor is injected into a space delimited by the free face of the film of electrochromic material of each of the preassembled substrates, and then subjected to polymerization or crosslinking.

5. The process as claimed in claim 4, wherein:
an electrically conductive film and a film of a cathode active material with electrochromic properties are successively deposited on one of the surfaces of a $1^{st}$ transparent substrate, to form the electrode,
an electrically conductive film and a film of an anode active material with electrochromic properties are successively deposited on one of the surfaces of a $2^{nd}$ transparent substrate, to form the counterelectrode;
a liquid composition to form the polymer electrolyte is applied to the film of electrochromic active material of one of the substrate the film of electrochromic material of the other substrate is applied to the layer of said composition; and
said composition is subjected to crosslinking or polymerization.

6. The process as claimed in claim 1, further comprising the steps of:
applying to an auxiliary film the composition free of volatile liquid solvent and comprising a polymer precursor and a salt, said auxiliary film being formed by a material selected from the group consisting of polypropylene, polyethylene, polyethylene terephthalate and polytetrafluoroethylene;
polymerizing or crosslinking the polymer precursor;
applying the crosslinked or polymerized polymer film to the electrochromic face of one of the substrates, followed by subjecting to a pressure with heat to reduce its dynamic viscosity u to a value of between 100 and $10^6$ Pa·s,
removing the auxiliary film, and
applying the electrochromic face of the other substrate to the face of the polymerized or crosslinked film freed by removal of the auxiliary film.

7. The process as claimed in claim 6, wherein the crosslinkable groups are acrylate groups.

8. The process as claimed in claim 7, wherein the liquid composition contains a mixture of a polymer of low molecular mass and a polymer of high molecular mass.

9. The process as claimed in claim 6, wherein the liquid monomers are selected from the group consisting of ethylene oxide, propylene oxide and 2,3-epoxy-1-propanol.

10. The process as claimed in claim 6, wherein the solvating polymer precursor is a polyether or a polyimine of low molecular mass, some repeating units of which bear a reactive group that enables crosslinking.

11. The process as claimed in claim 10, wherein the salt concentration of the liquid composition is from 0.1 M to 2 M.

12. The process as claimed in claim 11, wherein the crosslinking is performed by irradiation via UV radiation in the presence of a photoinitiator.

13. The process as claimed in claim 1, wherein the liquid composition further comprises a diluent, chosen from non-volatile organic solvents of low viscosity and of high boiling point.

14. The process as claimed in claim 1, wherein the liquid polymer precursor is chosen from liquid monomers or liquid polymers of low mass that are precursors for polyether or polyimine polymer chains, and which bear reactive groups that allow crosslinking.

15. The process as claimed in claim 1, wherein the liquid composition contains a salt of lithium and of an anion selected from the group consisting of Br⁻, ClO₄⁻, AsF₆⁻, R$_F$SO₃⁻, (R$_F$SO₂)₂N⁻ and (R$_F$SO₂)₃C⁻, wherein R$_F$ represents a perfluoroalkyl or perfluoroaryl group containing from 1 to 4 carbon atoms, and diaminocyclohexane-N,N'-tetraacetate (DCTA).

16. The process as claimed in claim 1, wherein the liquid composition containing the polymer precursor is applied to the face bearing the electrochromic material of a substrate by spin coating or using a doctor blade.

17. The process as claimed in claim 1, wherein the polymerization and crosslinking are performed by irradiation with UV radiation or an electron beam, or thermally, or via UV irradiation combined with a heat treatment.

18. The process as claimed in claim 1, wherein the crosslinking is performed by irradiation under an inert atmosphere.

19. The process as claimed in claim 1, wherein the active material of the electrochromic electrode is selected from the group consisting of WO₃, Li₄Ti₅O₁₂ and substituted polythiophenes.

20. The process as claimed in claim 19, wherein the tin oxide derivatives are selected from the group consisting of fluorine-doped tin oxide, tin-doped indium oxide (ITO), antimony-doped tin oxide and aluminum-doped zinc oxide.

21. The process as claimed in claim 1, wherein the active material of the counterelectrode is selected from the group consisting of Prussian blue, LiFePO4, NiO$_x$, conductive polymers of the polyaniline, polythiophene or polypyrrole type, and H$_x$IrO₂.

22. The process as claimed in claim 1, wherein the material chosen for the electrically conductive films is selected from the group consisting of tin oxide, indium oxide and zinc oxide derivatives.

23. The process as claimed in claim 1, wherein the transparent substrates are formed from a material chosen from mineral glasses or organic glasses used in ophthalmic.

24. The process as claimed in claim 23, wherein the substrate is a mineral glass selected from the group consisting of:
   sodocalcic glasses with a refractive index n$_d$=1.523 and a constringence of about 60;
   borosilicate glasses with a refractive index nd=1.600;
   titanium glasses with an index nd=1.7 and a constringence of 41;
   lanthanum glasses with an index nd=1.8 and a constringence of 34, and
   niobium, glasses with an index nd=1.9 and a constringence of 30.

25. The process as claimed in claim 23, wherein the substrate is art organic material selected from the group consisting of polycarbonates; polyamides, polyimides; polysulfanes; polymethyl methacrylates; copolymers of ethylene terephthalate and of carbonate; polyolefins, especially polynorbornenes; diethylene glycol bis(allyl carbonate)polymers and copolymers; (meth)acrylic polymers and copolymers, especially (meth)acrylic polymers and copolymers derived from bisphenol-A; thio(meth)acrylic polymers and copolymers; urethane and thiourethane polymers and copolymers; epoxy polymers and copolymers, and episulfide polymers, and copolymers.

26. An electrochromic lens obtained via a process as claimed in claim 1, the lens comprising an electrode and a counterelectrode separated by an electrolyte membrane, the electrode being formed by bearing an electrically conductive film coated with a film of a cathode-active material with electrochromic properties, the counterelectrode being formed by a transparent substrate bearing an electrically conductive-film coated with a film of an anode active material with electrochromic properties, the electrolyte being formed by an ion-conducting material comprising a salt dissolved in a solvating solid polymer.

27. The lens as claimed in claim 26, wherein the solid polymer is a crosslinked polymer formed by solvating polymer chains connected via crosslinking nodes.

28. The lens as claimed in claim 27, wherein the solvating polymer chains of the crosslinked polymers are of the polyether type or of the polyimine type.

29. The lens as claimed in claim 28, wherein the polymer chains are of the type ethylene oxide homopolymer (POE), propylene oxide homopolymer (POP), or copolymer of ethylene oxide or of propylene oxide with 2,3-epoxy-1-propanol.

30. The lens as claimed in claim 26, wherein the salt is a lithium salt of an anion selected from the group consisting of Br⁻, ClO₄⁻, AsF₆⁻; R$_F$SO₃⁻, (R$_F$SO₂)₂N⁻ and (R$_F$SO₂)₃C⁻, wherein R$_F$ represents a perfluoroalkyl or perfluoroaryl group containing from 1 to 4 carbon atoms, and diaminocyclohexane-N,N'-tetraacetate (DCTA⁻).

* * * * *